US006867396B2

(12) United States Patent
Haimer (10) Patent No.: US 6,867,396 B2
(45) Date of Patent: Mar. 15, 2005

(54) APPARATUS FOR INDUCTIVE HEATING OF A TOOL HOLDER

(75) Inventor: Franz Haimer, Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 0 days.

(21) Appl. No.: 10/305,411

(22) Filed: Nov. 26, 2002

(65) Prior Publication Data

US 2003/0168445 A1 Sep. 11, 2003

(30) Foreign Application Priority Data

Mar. 8, 2002 (DE) .................................... 202 03 784 U (51) Int. Cl.[7] .............................................. H05B 6/10
(52) U.S. Cl. ....................... 219/643; 219/635; 219/639; 219/652; 219/672
(58) Field of Search ................................ 219/635, 637, 219/639, 640, 641, 643, 647, 648, 652, 659, 671, 672, 674, 675, 676

(56) References Cited

U.S. PATENT DOCUMENTS 4,604,510 A * 8/1986 Laughlin et al. ............ 219/639
4,761,527 A * 8/1988 Mohr ......................... 219/635

* cited by examiner

Primary Examiner—Tu Hoang
(74) Attorney, Agent, or Firm—Scott D. Wofsy; Edwards & Angell, LLP (57) ABSTRACT

An apparatus for inductively heating a sleeve section, having a central holding opening for a shank of a rotary tool, of a tool holder that holds the shank in the holding opening in a press fit and releases it upon heating. The apparatus includes an induction coil arrangement with at least one induction coil, a generator that feeds the induction coil arrangement with electric current of periodically varying amplitude, and a yoke arrangement of magnetizable material, which concentrates the magnetic flux of the induction coil onto the sleeve section in a fashion distributed all around. The induction coil is axially offset from the tool holder axis of rotation, in particular substantially radially next to the axis of rotation, and does not wrap around the section. Furthermore, the induction coil includes a coil core, of magnetizable material, that is connected in a magnetically conducting fashion to the yoke arrangement.

13 Claims, 7 Drawing Sheets

APPARATUS FOR INDUCTIVE HEATING OF A TOOL HOLDER

BACKGROUND OF THE INVENTION

1. Field of the Invention

The invention relates to an apparatus for inductively heating a sleeve section, having a central holding opening for a shank of a rotary tool, for example a drill, milling cutter or reaming tool, of a tool holder that holds the tool shank in the holding opening in a press fit and releases it upon heating.

2. Background of the Related Art

Particularly in the case of rapidly rotating tools that run, for example, at speeds of 10 000–20 000 rpm or even higher, it is known to shrink the tool shank into a sleeve section of a tool holder. For this purpose, the sleeve section is heated, usually to a few 100° C., for example 250° C.–350° C., such that the holding opening of the sleeve section widens and the tool can be inserted with its shank into the holding opening. The nominal diameter of the holding opening is somewhat smaller than the outside diameter of the tool shank. After the cooling of the sleeve section, the tool shank is therefore held securely in terms of rotation in a press fit in the tool holder. This shrinking technique permits the tool to be clamped extremely accurately for true running and thus with little unbalance.

A gas flame was firstly proposed as heat source for heating the sleeve section, but thought has also been given to heating collars that are to be brought into bearing contact with the tool holder. Because they permit the heating up phase to be kept very short, attention has more recently been concentrated on inductive heating devices. Such inductive heating devices have so far regularly had an induction coil that is fed from a generator with alternating current or a pulsed direct current and can be mounted centrally on the sleeve section in order to heat it. The magnetic field of the induction coil induces in the electrically conducting material of the tool holder eddy currents that directly heat the sleeve section. In order to be able to use one and the same induction coil in the case of tool holders of different outside diameter of the sleeve section, the induction coil surrounds the sleeve section at an axial spacing in this case.

Usually, the induction coil is surrounded on its outer circumference by a yoke shell of magnetizable material. In addition, there are usually arranged at the axial end faces of the induction coil annular elements that likewise consist of magnetizable material and serve as pole shoes which are situated closely adjacent to the end of the sleeve section on the tool side and the end remote from the tool, in particular to even bear against the sleeve section. Because of their high magnetic conductivity relative to air, the yoke shell and the pole shoes ensure a concentration of the magnetic flux, which is directed, thus focused, onto the sleeve section.

SUMMARY OF THE INVENTION

The invention proceeds from an apparatus for inductively heating a sleeve section, having a central holding opening for a shank of a rotary tool, of a tool holder that holds the tool shank in the holding opening in a press fit and releases it upon heating, comprising an induction coil arrangement with at least one induction coil, a generator that feeds the induction coil arrangement with electric current of periodically varying amplitude, and a yoke arrangement, of magnetizable material, which concentrates the magnetic flux of the induction coil arrangement onto the sleeve section in a fashion distributed all around.

By contrast with the previous shrinking concepts with an induction coil that is to be mounted on the sleeve section in order to heat it, according to the invention, for the purpose of heating the sleeve section, the induction coil is arranged with reference to an axis of rotation of the tool holder in a fashion offset eccentrically from the sleeve section and without wrapping around said section, for example approximately radially next to the latter, and includes a coil core of magnetizable material, that is connected in a magnetically conducting fashion to the yoke arrangement.

In the case of the solution according to the invention, the entire tool holder can remain entirely outside the induction coil for the purpose of heating the sleeve section. Consequently, the axial mounting of the induction coil on the sleeve section or the axial insertion of the sleeve section into the induction coil is eliminated.

It has emerged that, even in the case of a tool holder arranged outside the induction coil, the magnetic flux can be directed onto the sleeve section in a sufficiently strongly focused fashion with the aid of the coil core and the yoke arrangement of magnetizable, that is to say ferromagnetic or ferrimagnetic material, in order to achieve the desired rapid heating of the sleeve section. It is advantageous in this case that the coil core can essentially completely fill up the coil interior and scattering losses in the coil interior can thus largely be reduced, otherwise than in the case of the conventional solutions, in which there regularly remains between the induction coil and the sleeve section inserted into the coil an empty radial space that renders scattering losses caused by the air in the coil interior unavoidable.

The offset arrangement of the induction coil additionally permits a better thermal insulation of the latter from the parts of the tool holder that are to be heated, and this facilitates the cooling of the coil.

Furthermore, in the solution according to the invention, there is no need for a yoke shell surrounding the induction coil at its outer circumference, and this can lead to design simplifications. Finally, the eccentrically offset arrangement of the induction coil provides a large degree of freedom in shaping the arrangement of the induction coil and that of the yoke. An example of these freedoms is the number of induction coils used. Thus, the induction coil arrangement can comprise only a single induction coil. However, it can also comprise a plurality of induction coils, with one coil core each, arranged distributed uniformly in the circumferential direction of the tool holder. Depending on the application, these coils can be connected at least partially in parallel or in series. If at least a fraction of the coils are connected in parallel, it is conceivable, in particular, to be able to activate a different number of coils depending on requirement.

A further example of the proffered freedoms of shaping relates to the direction in which the magnetic flux permeates the sleeve section. Thus, the induction coil arrangement and the yoke arrangement can be designed in such a way that, in order to heat the sleeve section, at least a portion of the magnetic flux, in particular substantially the entire magnetic flux, enters the sleeve section at points situated at an axial spacing from one another, and exits again from said section, preferably substantially without a circumferential offset between the entry and exit points. The induction coil arrangement and the yoke arrangement can, however, also be designed in such a way that, in order to heat the sleeve section, at least a portion of the magnetic flux, in particular substantially the entire magnetic flux, enters the sleeve section at points situated in the circumferential direction at a spacing from one another and emerges again from said section, if desired substantially without an axial offset between the entry and exit points. The flux of the sleeve section with a predominant or even exclusive component transverse to the axial direction provides a simple possibility of varying the strength of the magnetic flux axially along the sleeve section, and thus of influencing the expansion behavior of the sleeve section in axial terms.

The solution according to the invention also provides large degrees of freedom as regards the shape and orientation of the induction coil(s). At least one induction coil can, for example, be designed approximately as a cylindrical coil with a rectilinear coil axis. For the purpose of heating the sleeve section, the cylindrical coil can then be arranged with its coil axis substantially parallel to the tool holder axis, although another orientation can also be selected relative to the sleeve section, for example along a plane normal to the tool holder axis.

At least one induction coil can also be designed approximately as a cylindrical coil with a coil axis running in a curve, in particular as a toroidal coil. In this case, for the purpose of heating the sleeve section, the toroidal coil can be situated in a three-dimensional disk at least approximately orthogonal to the tool holder axis, or in a three-dimensional disk extending along the tool holder axis and including the latter.

Furthermore, at least one induction coil can be designed as a flat coil whose coil axis is situated, in order to heat the sleeve section, at least approximately orthogonal to the tool holder axis, in particular cuts the latter.

Given the presence of a plurality of induction coils, the yoke arrangement can comprise yoke elements that closely adjoin the sleeve section in order to heat it and are each connected in a magnetically conducting fashion only to the coil core of a single induction coil. However, the yoke arrangement can also comprise at least one yoke element that closely adjoins the sleeve section in order to heat it and which is connected in a magnetically conducting fashion to the coil cores of a plurality of, in particular all the, induction coils.

In a preferred embodiment, the yoke arrangement has a yoke clamp that is connected in a magnetically conducting fashion to the coil core of each induction coil and whose half clamps can be swiveled relative to one another about a swiveling axis running parallel eccentrically to the tool holder axis, between a clamp closed position, in which they hold the sleeve section between them in a closely adjacent fashion, and a clamp open position in which at least one of the clamp halves is swiveled away from the sleeve section. Such a yoke clamp permits the simple shrinking and outshrinking even of tools that have a substantially larger diameter in their operating region remote from the shank than the outside diameter of the sleeve region.

In order to reduce scattering losses caused by air as far as possible, for the purpose of heating the sleeve section, the yoke arrangement can reach up to near said section, or even bear against it. In order in the case of tool holders with a different diameter of the sleeve section not to have to exchange parts of the yoke arrangement or even the entire yoke arrangement, the radial position of at least one yoke element, which is closely adjacent to the sleeve section in order to heat it, of the yoke arrangement can be changed operationally relative to the sleeve section.

BRIEF DESCRIPTION OF THE DRAWINGS

The invention is explained in more detail below with the aid of the attached schematic drawings, in which.

DETAILED DESCRIPTION OF PREFERRED EMBODIMENTS

Figure 1:
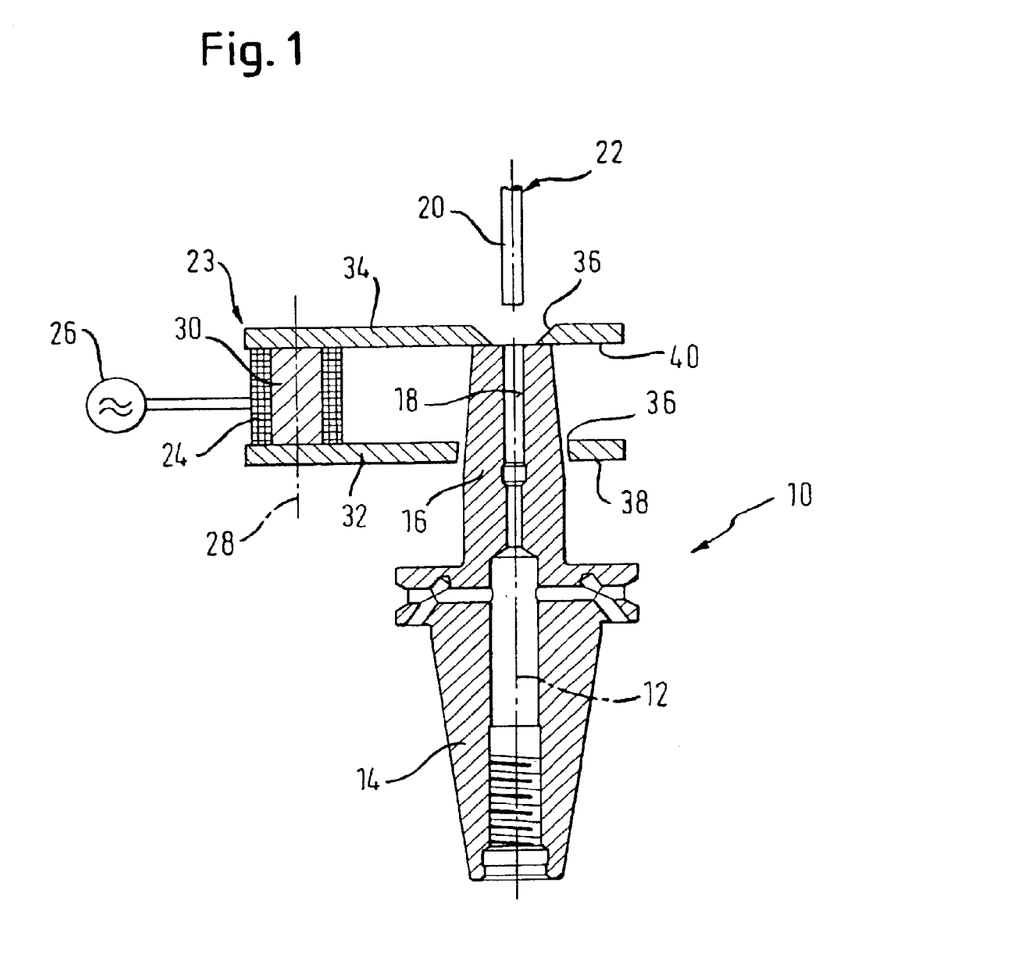
FIG. 1 shows an axial longitudinal section through a first exemplary embodiment of an inductive heating unit for shrinking and outshrinking of a rotary tool in a tool holder.

FIG. 1 shows a tool holder 10, one which is unipartite here, but could also be multipartite, of an electrically conducting, in particular also magnetizable material, for example steel. In the region of its axial end referred to an axis of rotation 12, the tool bolder 10 has a standard coupling piece 14, for example in the form of a steep-taper cone or hollow steep-taper cone, with the aid of which the tool holder 10 can be clamped in a machine tool (not illustrated in more detail). In the region of its opposite axial end, the tool holder 10 has a sleeve-shaped tool holding section 16 with a substantially cylindrical holding opening 18, centered in relation to the axis of rotation 12, into which a shank 20 of a rotary tool 22 (otherwise not illustrated in more detail in FIG. 1) can be inserted. The tool 22 can be, for example, a drill, a milling cutter or a reaming tool. The outside diameter of the shank 20 is somewhat greater than the nominal diameter of the holding opening 18, and so when it is inserted into the sleeve section 16 the shank 20 is held therein in a press fit guaranteeing the transfer of the desired operating torque.

In order to be able to insert the tool shank 20 into the tool holder 10 and remove it from the latter, the sleeve section 16 is widened by heating. The heating is performed by means of an inductive heating unit, denoted in general by 23, that comprises at least one induction coil 24 that is held (in a way not shown in more detail), on a holder of an induction-shrinking device equipped with the heating unit 23 and is fed from a current generator 26 with alternating current or pulsed direct current with a frequency in the kHz range, for example a few 10 kHz. The induction coil 24 is not mounted on the sleeve section 16 during heating operation of the heating unit 23. Rather, with reference to the axis 12 of the tool holder 10, it is offset eccentrically from the latter, that is to say the induction coil 24 does not wrap around the tool holder 10. In the example of FIG. 1, the coil 24 for heating the sleeve section 16 is arranged approximately at the same axial level to the side at a radial spacing next to the sleeve section 16. The magnetic flux that is generated by the induction coil 24, which is wound here in an approximately cylindrical fashion with a straight coil axis 28 and is arranged in an axially parallel fashion with the tool holder axis 12, is guided in a magnetic circuit through the sleeve section 16 and induces eddy currents there that heat the sleeve section 16 comparatively quickly and thus bring about an enlargement in the diameter of the holding opening 18 that permits the tool shank 20 to be pushed in and withdrawn.

In order to focus the magnetic flux of the induction coil 24 and to direct it onto the sleeve section 16, the interior of the induction coil 24 includes a coil core 30 that penetrates the coil over its entire axial length and preferably completely fills up the coil interior while avoiding empty air spaces, and that is connected in a magnetically conducting fashion to plate-shaped yoke elements 32, 34 that are arranged on the axial end faces of the induction coil 24 and cover the latter, if appropriate, and that for their part bridge the radial spacing between the induction coil 24 and the sleeve section 16 and, in a fashion closely adjoining magnetic pole regions 36, reach as far as the sleeve section 16. Closely adjoining here covers both a direct bearing contact and a slight air gap between the yoke plates 32, 34 and the sleeve section 16. The coil core 30 and the yoke plates 32, 34 can consist of ferromagnetic metal or of a magnetic composite material, such as ferrite, for example. The induction coil 24 can be wound onto a coil former of plastic or ceramic into which, for its part, the coil core 30 is inserted. However, it is also possible for the induction coil 24 to be wound directly onto the coil core 30. It is an advantageous feature of the eccentrically offset arrangement of the induction coil 24 that the risk of heating the induction coil 24 and a possible coil former is substantially reduced because of the large spacing, by comparison with conventional solutions, between induction coil 24 and sleeve section 16 such that—if it is at all necessary—the outlay on cooling need not be as high as previously for the induction coil 24.

In the exemplary embodiment of FIG. 1, the magnetic flux permeates the sleeve section 16 in the axial direction and in a fashion distributed substantially uniformly about the tool holder axis 12. For this purpose, the yoke plates 32, 34 have in the region of the sleeve section 16 annular regions 38, 40 that form the magnetic pole regions 36 on their inner circumference. One of the annular regions 38, 40, here the annular region 38, surrounds the sleeve section 16 close to the end of the sleeve section 16 remote from the tool. The other annular region 40 is situated adjoining the end of the sleeve section 16 close to the tool; it can likewise at least partially surround the sleeve section 16. Likewise, it can extend at least partially axially on the other side of the end face of the sleeve section 16 close to the tool in a radial fashion beyond the outer circumference of the sleeve section 16 in the direction of the inner circumference thereof, as is shown in FIG. 1. In this case, it can rest with its area axially facing the sleeve section 16 on the end face of the sleeve section 16 close to the tool. The annular regions 38, 40 are illustrated here as flat disks extending radially relative to the tool holder axis 12. Of course, they can also be of another shape, for example that of a conical shell. The concrete shape of the annular regions 38, 40 is selected, in particular, as a function of how the best possible magnetic shielding of the tool shank 20 can be achieved.

It is generally desired to be able to use induction-shrinking devices for tool holders with sleeve sections of different diameters. In the case of a unipartite design of the yoke plates 32, 34, it would be necessary to exchange the yoke plates for the purpose of adapting diameters. In order to avoid such an exchange, it is conceivable to make use of a plurality of yoke pieces that are arranged distributed uniformly around the tool holder axis 12 and are guided moveably relative to one another, for example by means of a cam/cam follower arrangement, in order to form the annular regions 38, 40. Reference may be made in this regard to WO 01/89758 A1, where various examples of such yoke pieces guided moveably relative to one another are shown in FIGS. 12–20. Reference is expressly made to the contents of said document.

To the extent that identical or identically acting components are concerned, the following description of the further figures has recourse to the same reference numerals as in FIG. 1, but with the addition of a lower case letter for the purpose of distinction. If nothing different results from the following, reference is made to the discussion above in relation to FIG. 1 for the purpose of explaining these components.

Figure 2A:
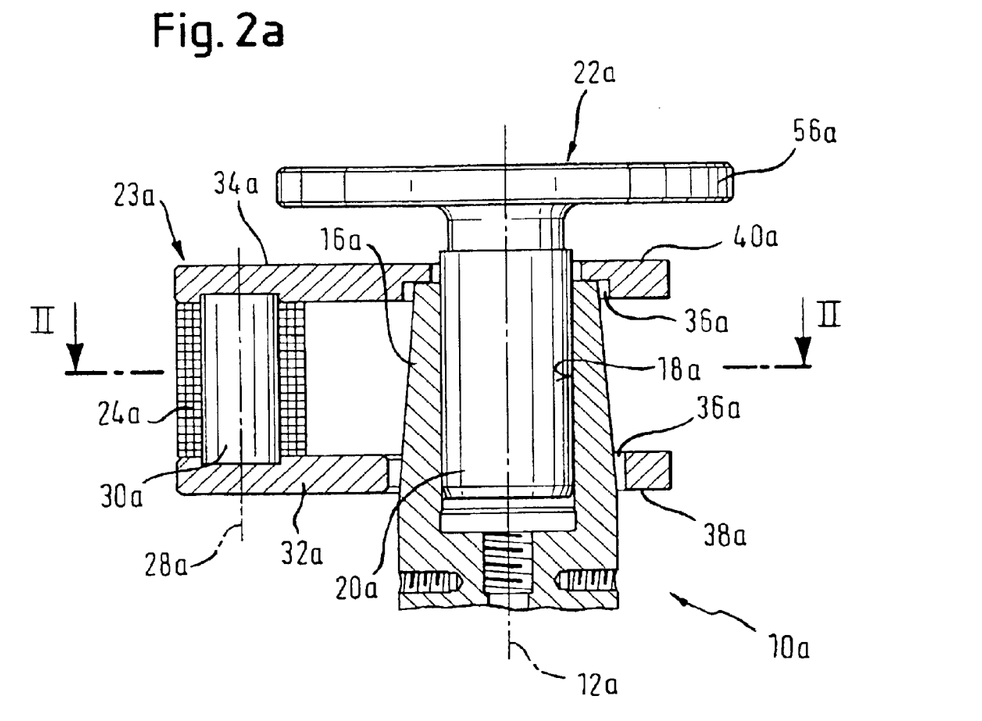
FIG. 2a shows an axial section through a second exemplary embodiment of an inductive heating unit.
Figure 2B:
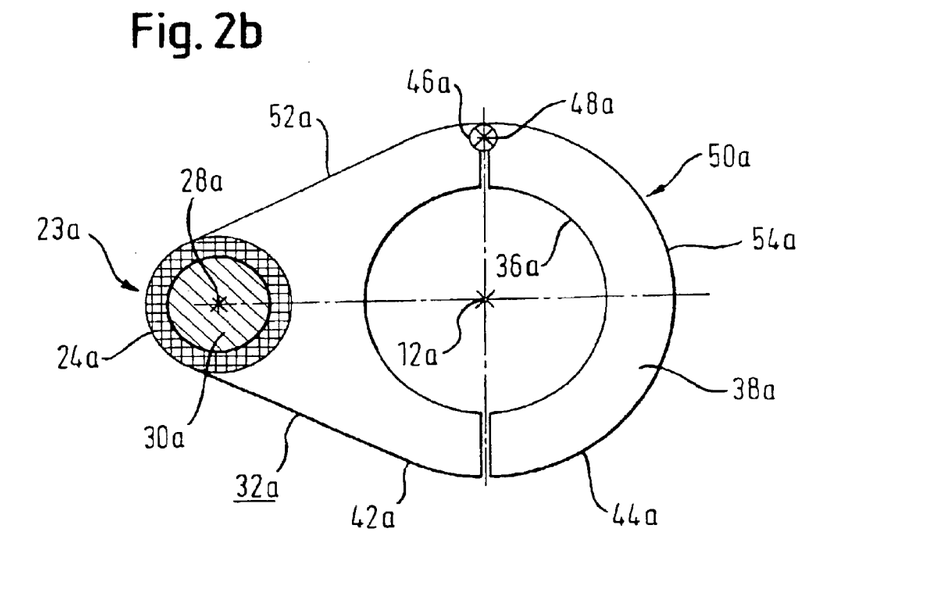
FIG. 2b shows an axial cross section, taken along line II—II in FIG. 2a, of the heating unit of FIG. 2a, FIG. 3a shows an axial section through a third exemplary embodiment of an inductive heating unit.

The exemplary embodiment of FIGS. 2a and 2b shows a heating unit 23a that corresponds essentially to the exemplary embodiment of FIG. 1. The, once again, plate-shaped yoke elements 32a, 34a of the heating unit 23a are divided, however, in each case into two partial yoke elements 42a, 44a (see FIG. 2b), of which each forms approximately a half of the annular region 38a, 40a of the relevant yoke element 32a, 34a. By means of a swivel joint arrangement 46a, the partial yoke elements 42a, 44a of the two yoke elements 32a, 34a are held such that they can be swiveled relative to one another about a swiveling axis 48a offset eccentrically from the tool holder axis 12a and from the coil axis 28a and parallel to these axes. Formed in this way is a yoke clamp 50a with two clamp halves 52a, 54a that are articulated relative to one another about the swiveling axis 48a and of which one clamp half 52a comprises the partial yoke element 42a of each of the yoke elements 32a, 34a, and whose other clamp half 54a comprises the partial yoke element 44a of each of the yoke elements 32a, 34a.

If the tool 20a is to be shrunk into the tool holder 10a or outshrunk therefrom, the yoke clamp 50a can be opened so far by folding out the clamp halves 52a, 54a relative to one another such that the sleeve section 16a can be inserted radially between the clamp halves 52a, 54a. Subsequently, the yoke clamp 50a can be closed again by folding the clamp halves 52a, 54a together relative to one another such that the magnetic pole regions 36a situated on the mutually facing insides of the clamp halves 52a, 54a are brought into close proximity with the sleeve section 16a, and current can be applied from the generator (not illustrated in more detail here) to the induction coil 24a for the purpose of thermal expansion of the sleeve section 16a.

The clamp solution is particularly advantageous when the aim is to shrink or outshrink a tool whose greatest outside diameter is substantially greater than the outside diameter of the sleeve section 16a, for example when the tool 22a bears a grinding plate 56a, as shown in FIG. 2a. Specifically, with the yoke clamp 50a closed, a tool holder in which such a tool is clamped cannot be moved axially into the heating unit 23a or moved out of the latter, otherwise than in the case of a tool whose operating range can fundamentally be conceived as not being greater than the shank diameter, or only insubstantially so. However, by opening the yoke clamp 50a, it is possible to create a radial passage through which it is possible to bring between the clamp halves 52a, 54a even a tool holder that bears a tool whose operating range is substantially greater than the sleeve section 16a of the tool holder.

Figure 3A:
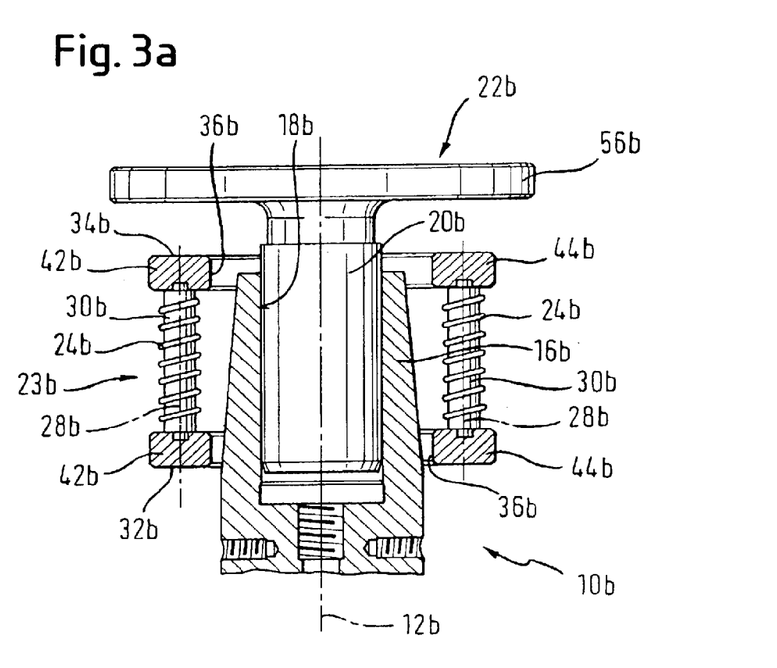
Figure 3B:
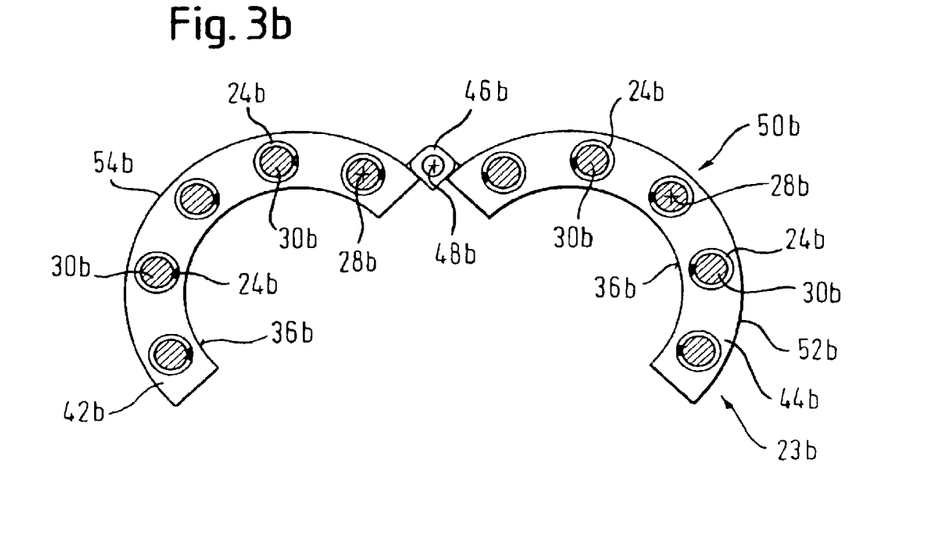
FIG. 3b shows an axial cross section through the heating unit of FIG. 3a, with yoke clamp opened.

FIGS. 3a and 3b show a heating unit 23b that differs from the exemplary embodiment of FIGS. 2a and 2b essentially in that it has not only a single induction coil 24b in the form of a right cylinder, but a plurality of such induction coils 24b that each include a coil core 30b and for the purpose of heating the sleeve section 16b of the tool holder 10b are arranged distributed uniformly in the circumferential direction about the sleeve section 16b and at a radial spacing close to the latter, in which case they are situated with their coil axes 28b parallel to the tool holder axis 12b. Here, the yoke elements 32b, 34b arranged on the axial end faces of the induction coils 24b and connected in a magnetically conducting fashion to the coil cores 30b form approximately annular disks. The yoke elements 32b, 34b form a yoke clamp 50b in a fashion similar to the exemplary embodiment of FIGS. 2a and 2b. For this purpose, the yoke elements 32b, 34b are each divided into two partial yoke elements 42b, 44b (see FIG. 3b) in the shape of semiannular disks that are held such that they can be swiveled relative to one another by means of the swivel joint arrangement 46b. FIG. 3b shows the yoke clamp 50b thus formed in the open state. Otherwise, the yoke clamp 50b corresponds in terms of its function to the yoke clamp 50a of FIGS. 2a and 2b.

Figure 4A:
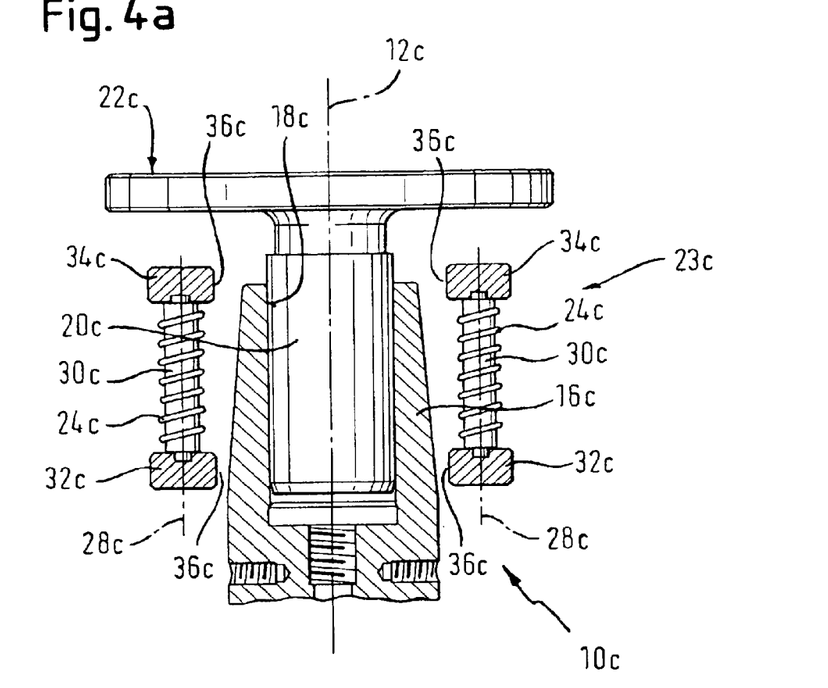
FIG. 4a shows an axial longitudinal section through a fourth exemplary embodiment of an inductive heating unit.
Figure 4B:
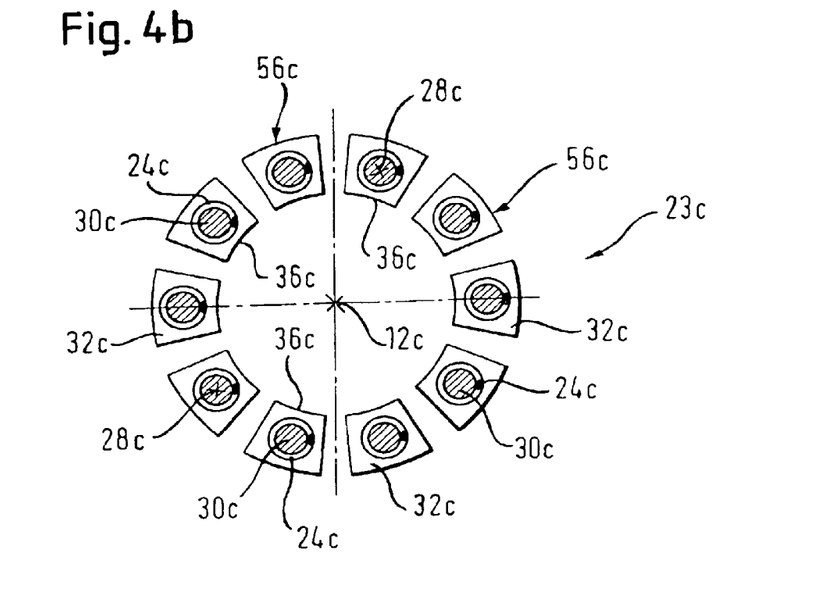
FIG. 4b shows an axial cross section through the heating unit of FIG. 4a, FIG. 5a shows an axial longitudinal section through a fifth exemplary embodiment of an inductive heating unit.

The variant of FIGS. 4a and 4b corresponds to the exemplary embodiment of FIGS. 3a and 3b to the extent that the heating unit 23c there likewise comprises a plurality of induction coils 23c, wound in the form of right cylinders, that, for the purpose of heating the sleeve section 16c of the tool holder 10c, are distributed at regular angular spacings around the sleeve section 16c and are arranged in this case with coil axis 28c parallel to the tool holder axis 12c at a radial spacing from the sleeve section 16c approximately at the same axial level as the latter. However, the heating unit 23c has no yoke clamp. Rather, each induction coil 24c is provided separately from the remaining coils at its axial end faces with yoke pieces 32c, 34c that are connected in a magnetically conducting fashion to the coil core 30c of the relevant coil 24c. A plurality of magnetically unconnected, separate heating elements 56c are formed, so to say, in this way and together form the heating unit 23c, being constructed in each case from an induction coil 24c, the coil core 30c thereof and the associated yoke pieces 32c, 34c. In order to permit adaptation to tool holders of different diameter, the radial position, referred to the tool holder axis 12c, of the heating elements 56c can be varied in operational terms. For this purpose, the heating elements can be guided moveably relative to one another on guide means (not illustrated in more detail), for example in the radial direction referred to the tool holder axis 12c. It goes without saying that instead of this it is also possible for only the yoke pieces 32c, 34c to be adjustable in their radial position relative to the sleeve section 16c, if it is ensured that the magnetically conducting contact with the coil cores 30c is retained upon adjustment of the yoke pieces 32c, 34c.

Figure 5A:
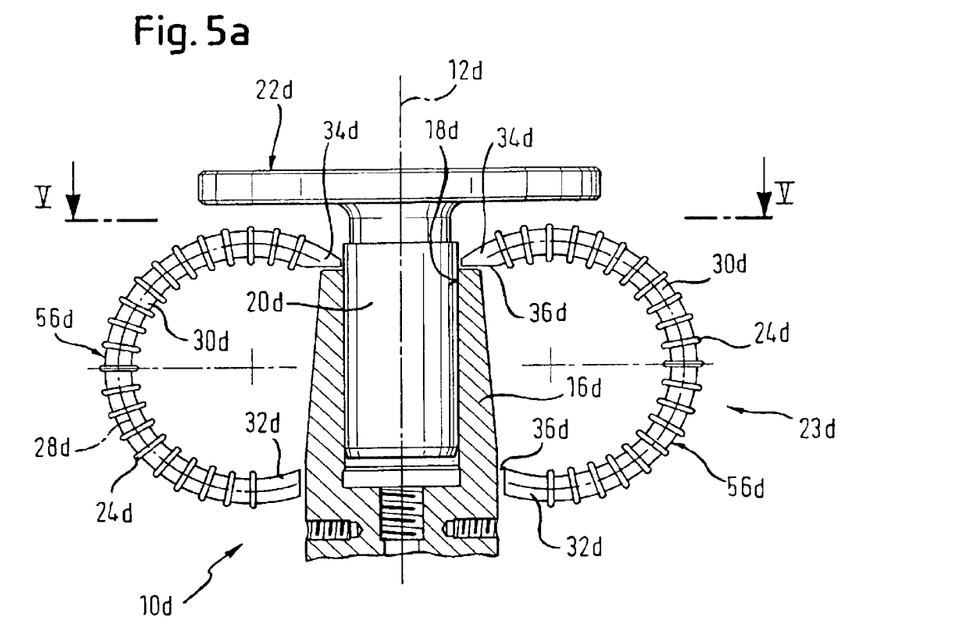
Figure 5B:
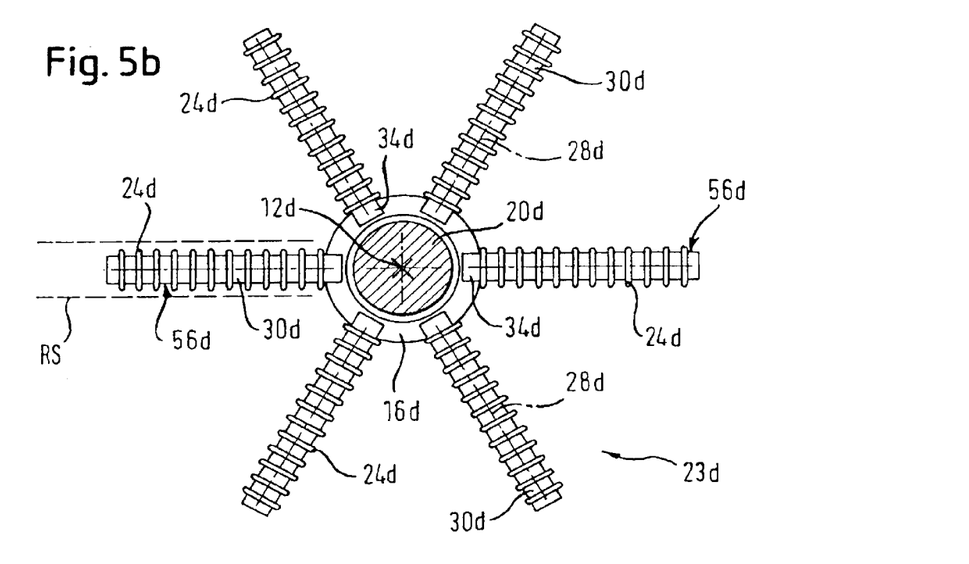
FIG. 5b shows an axial cross section along the line V—V in FIG. 5a, FIG. 6 shows an axial cross section through a sixth exemplary embodiment of an inductive heating unit.

In the case of the variant of FIGS. 5a and 5b, as well, the heating unit 23d there has a plurality of heating elements 56d that, for the purpose of heating the sleeve section 16d of the tool holder 10d, are arranged distributed at regular spacings around the sleeve section 16d. In a departure from the exemplary embodiment of FIGS. 4a and 4b, each heating element 56d has, by contrast, a toroidally wound cylindrical coil 24d with a coil axis 28d running approximately in the shape of a circular arc, the coil core 30d of each induction coil 24d being designed appropriately in the shape of a torus. Formed at the ends of each coil core 30d are yoke regions 32d, 34d with the aid of which the relevant heating element 56d is closely adjacent to the sleeve section 16d for the purpose of heating it. The yoke regions 32d, 34d can be formed by unipartite projections of the coil cores 30d. However, it is not excluded to form the yoke regions 32d, 34d by using separate material pieces of magnetizable material that are connected in a magnetically conducting fashion to the coil cores 30d.

In order to heat the sleeve section 16d, the heating elements 56d are respectively situated in a three-dimensional disk running parallel to the tool holder axis 12d and including the latter. Such a three-dimensional disk is indicated by dashes and denoted by RS in FIG. 5b for one of the heating elements 56d. It goes without saying that the heating elements 56d can be adjusted in their radial position relative to the tool holder 10d, for example by guiding them moveably in a radial fashion referred to the tool holder axis 12d in order, on the one hand, to permit adaptation to tool holders 10d of different diameter of the sleeve section and, on the other hand, to facilitate the insertion of the tool holder 10d between the heating elements 56d.

Figure 6:
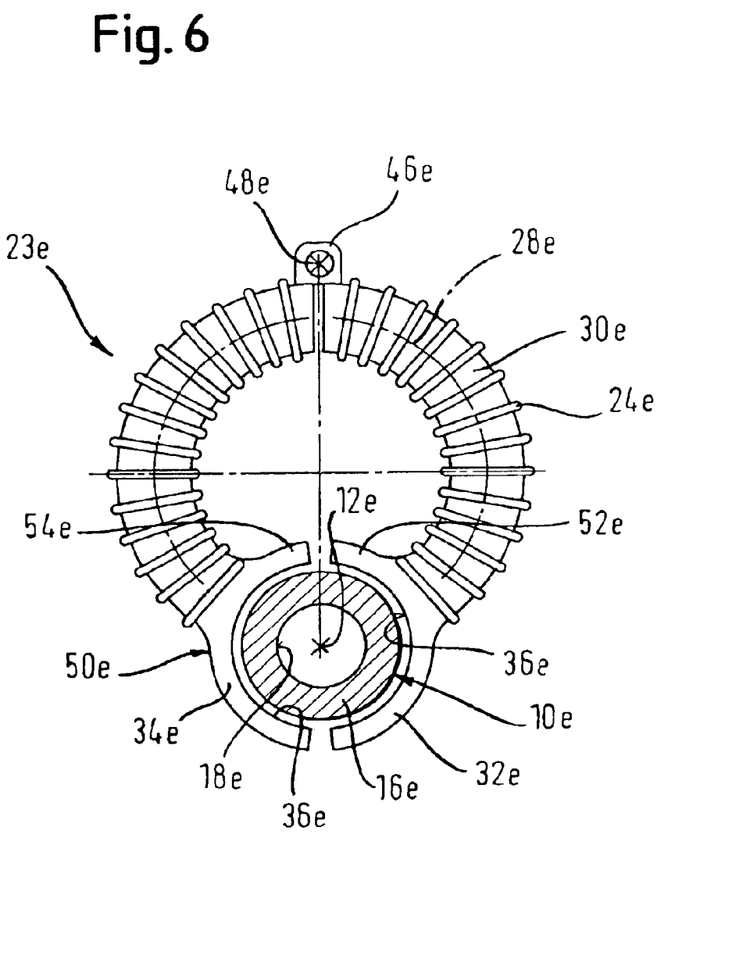

In the exemplary embodiments explained so far, the magnetic flux permeates the sleeve section of the tool holder in the axial direction. The magnetic flux can, however, also permeate the sleeve section transversely, in particular orthogonal to the axial direction. FIG. 6 shows an example of this. The heating unit 23e in accordance with this variant in turn comprises only a single induction coil 24e that is designed as a toroidal coil with a coil axis 28e, curved in the shape of a circular arc, and in accordance with a toroidal coil core 30e. For the purpose of heating the sleeve section 16e of the tool holder 10e, the induction coil 24e is arranged in a three-dimensional disk normal to the tool holder axis 12e. Provided at the ends of the coil core 30e are yoke elements 32e, 34e that have an approximately cylindrical shape of shell and face the sleeve section 16e with the inside of their shells and closely adjoin said section for the purpose of heating it. The yoke shells 32e, 34e extend in the axial direction substantially over the entire length of that region of the tool holder 10e which is to be heated. In the case of the example of FIG. 6, they surround the sleeve section 16e in the circumferential direction on a substantial portion of its outer circumference. A sufficiently large air gap should be present between the shell edges, adjacent in the circumferential direction, of the yoke shells 32e, 34e, in order to prevent a magnetic short circuit passing the sleeve section 16e. This holds, in particular, whenever, for the purpose of heating the sleeve section 16e, the yoke shells do not bear against said section but there is a radial air gap between the outer circumference of the sleeve section 16e and the shell inside of the yoke shells 32e, 34e.

The diametrically opposite arrangement of the yoke shells 32e, 34e on the outer circumference of the sleeve section 16e effects a magnetic flux within the sleeve section 16e, substantially along a plane orthogonal to the tool holders axis 12a. The points of entry and exit of the magnetic flux into and out of, respectively, the sleeve section 16e are therefore situated at points offset in the circumferential direction of the sleeve section 16e, and so it is possible, as it were, to talk of a transverse flux of the sleeve section 16e. It has emerged that the sleeve section 16e can be heated sufficiently rapidly even in the case of transverse flux in order to achieve the desired expansion of the holding opening 18e.

The yoke shells 32e, 34e can be designed in one piece with the coil core 30e, but they can also be formed by separate material pieces of magnetizable material. They are part of a yoke clamp 50e that is formed by virtue of the fact that the coil core 30e is divided into two, and its two parts are held such that they can swivel relative to one another by means of a swivel joint arrangement 46e.

Figure 7A:
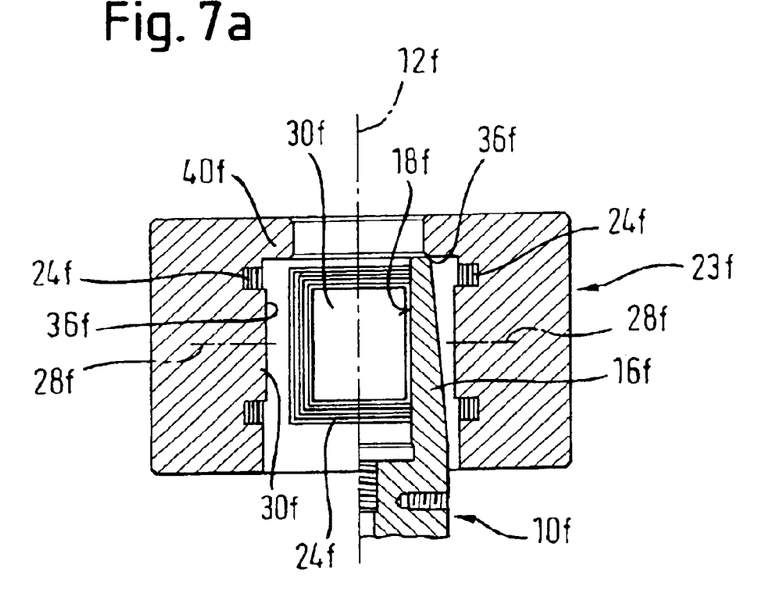
FIG. 7a shows an axial section through a seventh exemplary embodiment of an inductive heating unit.
Figure 7B:
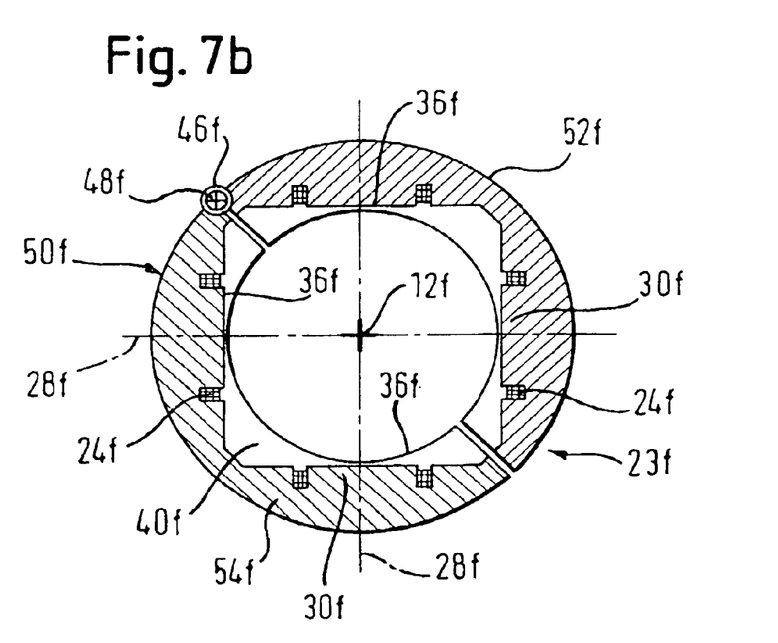
FIG. 7b shows the heating unit of FIG. 7a in axial cross section.

Finally, FIGS. 7a and 7b show a variant with a heating unit 23f that has a plurality of, here four flat coils 24f that, for the purpose of heating the sleeve section 16f of the tool holder 10f, are arranged at equal angular spacings around said section. The induction coils 24f are situated in this case in such a way that they cut the tool holder axis 12f approximately orthogonally with their coil axes 28f. They are held on a yoke clamp 50f whose magnetizable clamp material simultaneously forms the coil cores 30f of the induction coils 24f.

Magnetic pole regions 36f are formed on the sides, facing the outer circumference of the sleeve section 16f, of the coil cores 30f and, if appropriate, on the inner circumference of an annular yoke region 40f, formed by the yoke clamp 50f in its closed state, at the end of the sleeve section 16f near the tool. A more or less strong transverse flux component of the sleeve section 16f can be achieved depending on the direction in which the coils 24f are flowed through.

What is claimed is:

1. An apparatus for inductively heating a sleeve section of a tool holder holding a shank of a rotary tool in a press fit in a central holding opening of the sleeve section coaxially with an axis of rotation of the tool holder and releasing the shank upon heating, the apparatus comprising:
    a) an induction coil arrangement with at least one induction coil for heating the sleeve section, wherein the at least one induction coil includes a coil core of magnetizable material and is arranged eccentrically offset from the sleeve section without wrapping around the sleeve section;
    b) a yoke arrangement of magnetizable material for concentrating magnetic flux of the induction coil arrangement onto and distributed around of the sleeve section such that the magnetic flux enters and exits the sleeve sections at positions situated at an axial spacing from one another, wherein the coil core of the at least one induction coil is connected to the yoke arrangement magnetically conducting; and
    c) means for supplying electric current of periodically varying magnitude to the induction coil arrangement.

2. An apparatus as claimed in claim 1, wherein the induction coil arrangement comprises a single induction coil.

3. An apparatus as claimed in claim 1, wherein the induction coil arrangement comprises a plurality of said induction coils uniformly distributed in the circumferential direction of the tool holder.

4. An apparatus as claimed in claim 1, wherein the at least one induction coil has a rectilinear coil axis arranged substantially parallel to the axis of rotation.

5. An apparatus as claimed in claim 4, wherein the at least one induction coil is a cylindrical coil.

6. An apparatus as claimed in claim 1, wherein the at least one induction coil has a curved coil axis arranged along a plane extending radially to and including the axis of rotation.

7. Apparatus as claimed in claim 1, wherein the yoke arrangement comprises a plurality of yoke elements forming a pair of yoke clamps each of which is connected in a magnetically conducting fashion to an end of the coil core of the at least one induction coil and each of which has a portion closely adjacent the sleeve section when heating it, wherein the yoke elements are movable between a closed position of the yoke clamps in which they hold the sleeve section between them in a closely adjacent fashion and an open position of the yoke clamp.

8. An apparatus as claimed in claim 7, wherein each yoke clamp comprises a pair of said yoke elements swivelably connected to one another with a swiveling axis extending parallel and eccentrically to the axis of rotation.

9. An apparatus as claimed in claim 1, wherein the induction coil arrangement includes a plurality of said induction coils and the yoke arrangement includes a plurality of yoke elements connected in pairs to opposite ends of the coil core of each induction coil, and wherein the yoke elements are radially movable relative to the sleeve section.

10. An apparatus for inductively heating a sleeve section of a tool holder holding a shank of a rotary tool in a press fit in a central holding opening of the sleeve section coaxially with an axis of rotation of the tool holder and releasing the shank upon heating, the apparatus comprising:
    a) an induction coil arrangement with a plurality of induction coils for heating the sleeve section, wherein each of the induction coil includes a coil core of magnetizable material and is arranged eccentrically offset from the sleeve section without wrapping around the sleeve section;
    b) a yoke arrangement of magnetizable material for conducting magnetic flux of the induction coil arrangement onto and distributed around of the sleeve such that the magnetic flux enters and exits the sleeve section at positions situated in the circumferential direction at a spacing from one another, wherein the coil cores are connected to the yoke arrangement magnetically conducting, wherein the yoke arrangement comprises a plurality of yoke elements forming a yoke clamp, each yoke element, being connected in a magnetically conducting fashion to one end of the coil core of a plurality of said induction coils, and wherein the yoke elements are movable between a closed position of the yoke clamp in which a second end opposite said one end of each coil core has a position closely adjacent the sleeve section when heating it and an open position of the yoke clamp; and
    c) means for supplying electric current of periodically varying magnitudes to the induction coil arrangement.

11. An apparatus as claimed in claim 10, wherein the yoke clamp comprises a pair of said yoke elements swivelably connected to one another with a swiveling axis extending parallel and eccentrically to the axis of rotation.

12. An apparatus for inductively heating a sleeve section of a tool holder holding a shank of a rotary tool in a press fit in a central holding opening of the sleeve section coaxially with an axis of rotation of the tool holder and releasing the shank upon heating, the apparatus comprising:
    a) an induction coil arrangement with at least one induction coil for heating the sleeve section, wherein the at least one induction coil includes a coil core of magnetizable material and is arranged eccentrically offset from the sleeve section without wrapping around the sleeve section;
    b) a yoke arrangement of magnetizable material for conducting magnetic flux of the induction coil arrangement onto and distributed around of the sleeve section such that the magnetic flux enters and exits the sleeve section at positions situated in the circumferential direction at a spacing from one another, wherein the coil core is connected to the yoke arrangement magnetically conducting, wherein the yoke arrangement comprises a pair of yoke elements forming a yoke clamp, each yoke element being connected in a magnetically conducting fashion to an end of the coil core of said at least one induction coil, and wherein the yoke elements are movable between a closed position of the yoke clamp in which a portion of each yoke element opposite said end of the coil core has a position closely adjacent the sleeve section when heating it and an open position of the yoke clamp; and c) means for supplying electric current of periodically varying magnitudes to the induction coil arrangement.

13. An apparatus as claimed in claim 12, wherein the yoke clamp comprises a pair of said yoke elements swivelably connected to one another with a swiveling axis extending parallel and eccentrically to the aids of rotation.

* * * * *